No. 686,479. Patented Nov. 12, 1901.
J. RANZ.
CHURN.
(Application filed July 16, 1900.)
(No Model.)
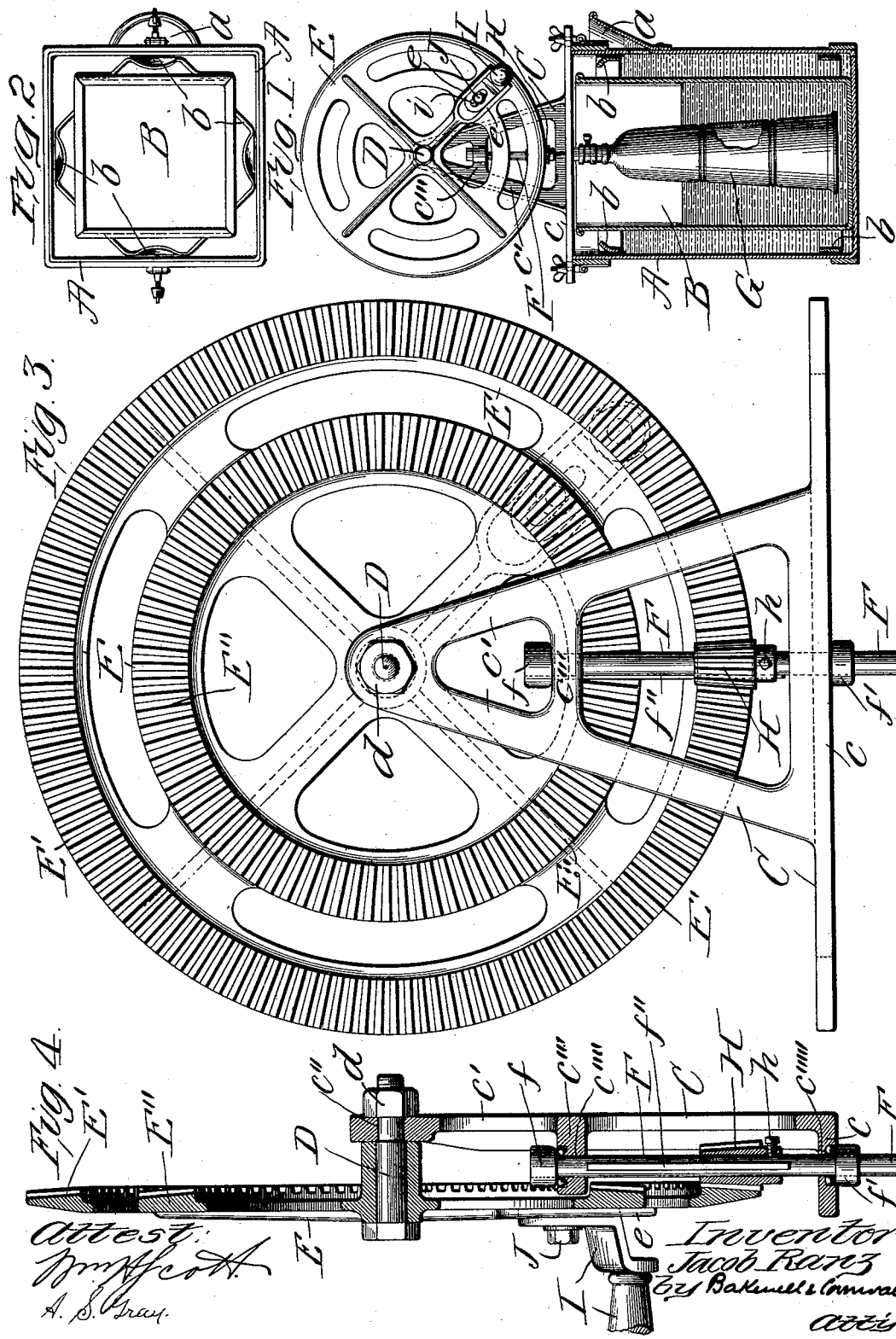

UNITED STATES PATENT OFFICE.

JACOB RANZ, OF ST. LOUIS, MISSOURI.

CHURN.

SPECIFICATION forming part of Letters Patent No. 686,479, dated November 12, 1901.

Application filed July 16, 1900. Serial No. 23,757. (No model.)

*To all whom it may concern:*

Be it known that I, JACOB RANZ, a citizen of the United States, residing at the city of St. Louis, State of Missouri, have invented a certain new and useful Improvement in Churns, of which the following is a full, clear, and exact description, such as will enable others skilled in the art to which it appertains to make and use the same, reference being had to the accompanying drawings, forming part of this specification, in which—

Figure 1 is a side elevational view, partly in section, of my improved churn. Fig. 2 is a plan view of the double casing employed in my improved churn. Fig. 3 is an enlarged side elevational view of the power portion of my improved churn, and Fig. 4 is a vertical sectional view of the same.

This invention relates to a new and useful improvement in churns, the same being of that type known as "revoluble dashers," and has for its object to provide a simple, durable, and inexpensive device of that character.

The essential features of my improved churn reside, first, in the novel construction and arrangement of the double casing, whereby the usual liquid to be churned is introduced into the inner reservoir and a suitable tempering liquid is introduced into the outer casing, the construction of the parts being such that the operator can readily withdraw the inner casing or reservoir for cleaning or for discharging its contents; second, in the novel construction of the dasher; and, finally, the invention consists in the novel construction, arrangement, and combination of the several parts of my improved churn, all as will hereinafter be described and afterward pointed out in the claims.

In the drawings, wherein like characters designate like parts throughout the several views, A indicates a suitable casing, preferably, but not necessarily, in the form of a rectangular box, which may have its top and bottom edges suitably stiffened for the sake of forming a rigid structure.

B indicates a reservoir designed to be placed within the casing A and, like said casing, is preferably in the form of a rectangular box, the same, however, being somewhat smaller than said casing in horizontal dimensions in order that a space may be left between it and the inner faces of said casing A for the purpose of receiving a tempering liquid, which tempering liquid is preferably introduced into the casing A and around the reservoir B through a funnel $a$, located near the top of one of the sides of casing A. In order that this reservoir B will occupy practically the center of casing A, I have arranged thereon suitable distance or guide pieces $b$, which distance or guide pieces also serve as handles or bails by which the reservoir B can be easily removed from the casing A and carried to any desired place.

C indicates a frame which is designed to bridge reservoir B and casing A, being removably secured to the latter by pivoted bolts and wing-nuts, which are secured to casing A and coöperate with said frame by causing the bolts to swing into slots in said frame, after which the wing-nuts are screwed down tightly to clamp the parts together.

Frame C is preferably made in the form of a metal casting and consists of a base portion $c$, from which rises an A-shaped portion $c'$, the apex of which is provided with a cylindrical bore $c''$, designed to receive a stud-shaft D, upon which is loosely mounted a wheel E, which will hereinafter be more fully described. Frame C is provided with a horizontal member $c'''$, located at a suitable place between the base $c$ and its apex, said horizontal portion being provided with a cylindrical bore $c''''$, and in vertical alinement with said bore $c''''$ and formed in the base portion $c$ is a second cylindrical bore $c'''''$. Through these alining bores $c''''$ and $c'''''$ passes a vertical shaft F, which is designed to rotate freely therein, and in order that this shaft F will have as little friction as possible in its bearings I have arranged two series of ball-bearings, one series being located in a suitable recess in the upper face of the horizontal member $c'''$ and the other series in a suitable recess in the lower face of the base $c$. Both of these sets of balls are held in place by suitable collars $f$ and $f'$, secured to the shaft F and arranged above and below the horizontal portion $c'''$ and the base $c$, respectively.

These collars $f$ and $f'$ not only hold the antifrictional balls in their respective recesses, but also receive the longitudinal thrust or movement of shaft F, or, in other words, these collars rest directly against the balls and provide an antifrictional bearing for the longitudinal thrust of said shaft. The lower end of this shaft F carries a hollow metallic dasher G, which is cylindrical or conical in shape and is designed to be received in the reservoir B, the same being preferably of such length that it will not when in proper position touch the bottom of said reservoir. Another object in making this dasher of metal is that it is not susceptible of absorbing moisture or becoming warped or "water-soaked," as is the case with wooden dashers, which is a great disadvantage in this class of churns, for if one portion of the dasher is heavier than another centrifugal force causes the same to run on other than a perpendicular axis and makes the device that much harder to manipulate. This dasher is detachably secured to the lower end of the shaft F, the opening for receiving said shaft forming the mouth or what might be termed the "bottle-shaped dasher." Tempering liquid may be introduced through this mouth into the dasher and the dasher arranged on the shaft, said shaft serving as a plug to retain the tempering liquid in the dasher and preventing its overflow into the contents of the inner receptacle. By introducing the tempering liquid in the dasher and the tempering liquid around the inner receptacle I am enabled to maintain a more even temperature of the cream.

Mounted upon the shaft F and preferably arranged between the base $c$ and the horizontal member $c'''$ is a pinion or small bevel-gear H, the same being held against independent rotation on its shaft F by a key $f''$, which is received in a suitable key seat or slot formed in said pinion. This pinion or gear H is susceptible of longitudinal movement on the shaft F, the same being held in a desired place by a set-screw $h$, carried thereby, and which when properly tightened will impinge against said shaft.

The wheel E, before referred to, is in reality a double bevel-gear or is provided with two sets of bevel-gear teeth E' and E'', concentrically arranged with respect to each other and in respect to the before-mentioned stud-shaft D, upon which said gears are mounted. In the drawings I have illustrated the outer set of bevel-gear teeth E' in mesh with the pinion H, and when the wheel E is rotated in either direction the dasher G will through the instrumentality of its conjoined shaft and the pinion H be rotated. When it is desired to make the mechanism run with less application of power, all that is necessary is to loosen the nut $d$, which clamps the stud-shaft D to the frame C, and slide said stud-shaft and its carried wheel longitudinally, causing the bevel-gear E' to move out of mesh with the pinion H. The set-screw which fastens the pinion H to its shaft is now loosened and the pinion slid longitudinally the shaft until it registers with the inner bevel-gear E'' and secure the same in position by tightening the set-screw. The wheel E is now moved toward pinion H and caused to mesh therewith and the nut $d$ on the shaft D screwed tightly home.

I indicates a handle which is adjustably secured to the wheel E, the same being designed to be grasped by the operator for the purpose of manipulating the churn. The inner portion of this handle I is bent at right angles and is provided with a slot $i$, through which passes a bolt J, secured to the wheel E, said right-angle portion being received in a groove formed by ribs or projections $e\ e$ on said wheel E.

When it is desired to increase or diminish the leverage between the handle and the axis of the wheel E, the bolt J is loosened and the handle slid to the desired point, after which the screw J is screwed tightly home.

I am aware that minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. In a churn, the combination with a receptacle, and a dasher therein, of mechanism detachably secured to said receptacle and dasher for supporting and rotating the dasher, comprising a base adapted to rest on the receptacle, devices for detachably holding the base in place, a standard C carried by said base and having at its upper end a bearing for a horizontal shaft, and between said bearing and the base, a bearing-lug $c'''$, a horizontal shaft D secured in said bearing, a dasher-shaft F detachably connected to the dasher and extending up through bearings in the base and in said bearing-lug, a collar $f$ on said shaft above said bearing-lug, a collar $f'$ on said shaft below the base, a bevel-pinion on said shaft F between the bearing-lug and the base, means for securing the pinion in adjusted positions on said shaft, a bevel driving-gear carried by said shaft D and having a plurality of toothed portions with either of which said bevel-pinion is adapted to mesh by being moved on said shaft F, and means for holding the shaft D in its bearing and permitting it to be moved to carry the driving-gear away from the standard in order to permit of the bevel-pinion being moved on the shaft F, substantially as described.

2. In a churn, the combination of a casing, a receptacle located within said casing, spacing devices in the form of metallic straps secured to said receptacle for holding the same away from the walls of the casing, said spacing devices being provided with inbent portions constituting handles for removing the receptacle from the casing, substantially as described.

In testimony whereof I hereunto affix my signature, in the presence of two witnesses, this 12th day of July, 1900.

JACOB RANZ.

Witnesses:
 WM. H. SCOTT,
 A. S. GRAY.